(12) United States Patent
Ernst et al.

(10) Patent No.: US 10,914,228 B2
(45) Date of Patent: Feb. 9, 2021

(54) WASTE HEAT RECOVERY WITH ACTIVE COOLANT PRESSURE CONTROL SYSTEM

(71) Applicant: Cummins Inc., Columbus, IN (US)

(72) Inventors: Timothy C. Ernst, Columbus, IN (US); James A. Zigan, Versailles, IN (US); John Scott Blackwell, Greenwood, IN (US)

(73) Assignee: Cummins Inc., Columbus, IN (US)

(*) Notice: Subject to any disclaimer, the term of this patent is extended or adjusted under 35 U.S.C. 154(b) by 62 days.

(21) Appl. No.: 15/803,933

(22) Filed: Nov. 6, 2017

(65) Prior Publication Data

US 2018/0135503 A1    May 17, 2018

Related U.S. Application Data

(60) Provisional application No. 62/422,456, filed on Nov. 15, 2016.

(51) Int. Cl.
*F01P 9/02* (2006.01)
*F01K 23/10* (2006.01)
(Continued)

(52) U.S. Cl.
CPC ............ *F01P 9/02* (2013.01); *B60K 11/04* (2013.01); *F01K 11/02* (2013.01); *F01K 23/065* (2013.01);
(Continued)

(58) Field of Classification Search
CPC ....... F01K 11/02; F01P 7/14; F01P 2005/105; F02G 5/02
(Continued)

(56) References Cited

U.S. PATENT DOCUMENTS

| 6,082,626 A * | 7/2000 | Morikawa | ................ | B60H 1/02 |
| | | | | 237/12.3 B |
| 7,323,102 B2 | 1/2008 | Klein et al. | | |

(Continued)

FOREIGN PATENT DOCUMENTS

| CN | 102472121 | 5/2012 |
| CN | 103615310 | 3/2014 |

(Continued)

OTHER PUBLICATIONS

Office Action from corresponding CN Application No. 201711124236.6, dated Sep. 16, 2019, pp. 1-5.

*Primary Examiner* — Lindsay M Low
*Assistant Examiner* — Omar Morales
(74) *Attorney, Agent, or Firm* — Foley & Lardner LLP

(57) ABSTRACT

A waste heat recovery (WHR) and coolant system with active coolant pressure control includes an engine cooling system, a WHR system, and a coolant pressure control system. A coolant heat exchanger positioned along each of the engine cooling and working fluid circuits, and is structured to transfer heat from the coolant fluid to the working fluid. The coolant pressure control system includes a pressure line operatively coupled to an air brake system and to the coolant tank. A valve is coupled to the pressure line upstream of the coolant tank. A coolant pressure controller is in operative communication with each of the valve, an air pressure sensor, and a coolant temperature sensor. The coolant pressure controller is structured to determine a target coolant pressure based on a coolant temperature and control a valve position of the valve so as to cause the air pressure to approach the target coolant pressure.

15 Claims, 3 Drawing Sheets

(51) Int. Cl.
  *F01K 23/06* (2006.01)
  *B60K 11/04* (2006.01)
  *F01P 3/20* (2006.01)
  *F01P 7/16* (2006.01)
  *F01P 11/18* (2006.01)
  *F01K 11/02* (2006.01)
  *F01P 3/02* (2006.01)
  *F01P 7/14* (2006.01)
  *F01P 11/12* (2006.01)
  *F02G 5/02* (2006.01)
  *F01P 5/10* (2006.01)
  *B60K 11/02* (2006.01)

(52) U.S. Cl.
  CPC ............ *F01K 23/10* (2013.01); *F01K 23/101* (2013.01); *F01P 3/02* (2013.01); *F01P 3/20* (2013.01); *F01P 7/14* (2013.01); *F01P 7/165* (2013.01); *F01P 11/12* (2013.01); *F01P 11/18* (2013.01); *B60K 11/02* (2013.01); *F01P 2005/105* (2013.01); *F01P 2025/04* (2013.01); *F01P 2025/08* (2013.01); *F01P 2025/32* (2013.01); *F01P 2025/62* (2013.01); *F01P 2025/66* (2013.01); *F01P 2060/045* (2013.01); *F01P 2060/14* (2013.01); *F01P 2060/16* (2013.01); *F02G 5/02* (2013.01); *Y02T 10/12* (2013.01)

(58) Field of Classification Search
  USPC ....................................................... 123/41.08
  See application file for complete search history.

(56) References Cited

U.S. PATENT DOCUMENTS

| | | | |
|---|---|---|---|
| 8,544,270 B2 | 10/2013 | Kasuya | |
| 8,613,193 B2 | 12/2013 | Mori et al. | |
| 9,289,710 B2 | 3/2016 | Hasenfratz et al. | |
| 9,359,979 B2 | 6/2016 | Schmid et al. | |
| 9,586,168 B2 | 3/2017 | Schmid et al. | |
| 9,586,557 B2 | 3/2017 | Schmid et al. | |
| 2005/0077230 A1 | 4/2005 | Jokschas et al. | |
| 2005/0263451 A1 | 12/2005 | Kramer | |
| 2011/0016863 A1* | 1/2011 | Ernst | F01K 25/10 60/645 |
| 2012/0132583 A1 | 5/2012 | Son et al. | |
| 2013/0126416 A1 | 5/2013 | Weindorf et al. | |
| 2014/0260146 A1 | 9/2014 | Dudr et al. | |
| 2014/0331627 A1 | 11/2014 | Majer et al. | |
| 2015/0008172 A1 | 1/2015 | Kocksch | |
| 2015/0013291 A1 | 1/2015 | Neef et al. | |
| 2015/0013334 A1 | 1/2015 | Elsaesser et al. | |
| 2015/0014237 A1 | 1/2015 | Kocksch | |
| 2015/0014241 A1 | 1/2015 | Wyhler | |
| 2015/0033688 A1 | 2/2015 | Wagner et al. | |
| 2015/0159535 A1* | 6/2015 | Zigan | F01N 5/02 60/615 |
| 2015/0165344 A1 | 6/2015 | Kocksch | |
| 2016/0023137 A1 | 1/2016 | Sorger et al. | |
| 2016/0101380 A1 | 4/2016 | Pereira Madeira | |
| 2016/0115917 A1 | 4/2016 | Sorger et al. | |
| 2017/0007536 A1 | 1/2017 | Wagner | |

FOREIGN PATENT DOCUMENTS

| | | |
|---|---|---|
| CN | 105587426 | 5/2016 |
| DE | 10 2012 017 141 | 2/2013 |
| DE | 10 2013 011 612 | 9/2014 |
| DE | 10 2013 011 617 | 1/2015 |
| DE | 10 2013 011 620 | 1/2015 |
| DE | 10 2014 009 706 | 1/2015 |
| DE | 10 2013 013 487 | 2/2015 |
| DE | 10 2014 011 536 | 2/2015 |
| DE | 10 2013 017 577 | 4/2015 |
| DE | 10 2014 015 613 | 4/2015 |
| DE | 10 2013 020 286 | 6/2015 |
| DE | 10 2012 003 156 | 2/2016 |
| DE | 10 2013 015 143 | 5/2016 |
| DE | 10 2013 011 616 | 12/2016 |
| WO | WO-2013/139992 | 9/2013 |

\* cited by examiner

WASTE HEAT RECOVERY WITH ACTIVE COOLANT PRESSURE CONTROL SYSTEM

CROSS-REFERENCE TO RELATED PATENT APPLICATIONS

This application claims the benefit of and priority to U.S. Provisional Patent Application No. 62/422,456, filed Nov. 15, 2016, the contents of which are incorporated herein by reference in its entirety.

TECHNICAL FIELD

The present disclosure relates generally to waste heat recovery ("WHR") systems and engine cooling systems.

BACKGROUND

In operation, internal combustion engines discharge heat energy into the external environment through exhaust gas, engine cooling systems, charge air cooling systems, etc. The discharged heat energy that is not used to perform useful work is typically known as "waste heat." Waste heat recovery ("WHR") systems capture a portion of the waste heat to perform useful work, such as generating shaft power via an expander (e.g., a turbine). Some WHR systems use a Rankine cycle. A Rankine cycle is a thermodynamic process in which heat is transferred to a working fluid in a Rankine cycle circuit. The working fluid is pumped to a boiler where it is vaporized. The vapor is passed through an expander and then through a condenser, where the vapor is condensed back to a fluid. The expander may drive a generator to generate electrical energy. An Organic Rankine cycle ("ORC") is a Rankine cycle in which the working fluid is an organic, high molecular mass fluid with a liquid-vapor phase change at a lower temperature than that of water. Such a fluid allows for heat recovery from relatively lower temperature sources relative to other Rankine cycle systems.

SUMMARY

Various embodiments relate to a WHR and coolant system with active coolant pressure control. An example system includes an engine cooling system, a WHR system, and a coolant pressure control system. The engine cooling system includes a coolant tank and an engine cooling circuit in coolant fluid receiving communication with the coolant tank. The engine cooling circuit includes a first pump structured to circulate the coolant fluid through the engine cooling circuit. A coolant heat exchanger is positioned along the engine cooling circuit. A first temperature sensor is also positioned along the engine cooling circuit. The first temperature sensor is structured to provide a coolant temperature value of the coolant fluid flowing through the engine cooling circuit. The waste heat recovery system includes a working fluid circuit including a second pump structured to circulate a working fluid through the working fluid circuit. The coolant heat exchanger is positioned along the working fluid circuit and is structured to transfer heat from the coolant fluid to the working fluid. A coolant pressure control system is operatively coupled to the engine cooling system. The coolant pressure control system includes a pressure line operatively coupled to a pressure source and to the coolant tank. The pressure line is structured to receive pressurized air from the pressure source and to provide the pressurized air to the coolant tank. A valve is operatively coupled to the pressure line upstream of the coolant tank. A pressure sensor is operatively coupled to the pressure line downstream of the valve and upstream of the coolant tank. The pressure sensor is structured to provide a pressure value indicative of a pressure in the coolant tank. A coolant pressure controller is in operative communication with each of the valve, the pressure sensor, and the first temperature sensor. The coolant pressure controller structured to interpret the pressure value, interpret the coolant temperature value, determine a target coolant pressure based on the coolant temperature value, and control a valve position of the valve so as to cause the pressure value to approach the target coolant pressure.

Various other embodiments relate to a method of active coolant pressure control. In an example method, a coolant fluid is pumped through an engine cooling circuit including an engine, a radiator, a coolant heat exchanger, and a coolant tank. A working fluid is pumped through a working fluid circuit including the coolant heat exchanger, an expander, and a condenser. Pressurized air is transmitted from a pressure source to the coolant tank through a pressure line. A pressure value indicative of a pressure in the coolant tank is received from a pressure sensor operatively coupled to the pressure line. The pressure value is interpreted. A coolant temperature value of the coolant fluid flowing through the engine cooling circuit is received from a temperature sensor positioned in the engine cooling circuit. The coolant temperature value is interpreted. A target coolant pressure is determined based on the temperature value. A valve position of a valve operatively coupled to the pressure line is controlled so as to cause the pressure value to approach the target coolant pressure.

Various other embodiments relate to an active coolant pressure control system. An example system includes a pressure line operatively coupled to a pressure source and to a coolant tank. The coolant tank is in coolant fluid providing communication with an engine cooling system. A valve is operatively coupled to the pressure line upstream of the coolant tank. A coolant pressure controller is in operative communication with the valve. The coolant pressure controller is structured to determine a pressure in the coolant tank. A temperature of the coolant fluid in the engine cooling system is determined. A target coolant pressure is determined based on the temperature of the coolant fluid in the engine cooling system. A valve position of the valve is controlled so as to cause the pressure in the coolant tank to approach the target coolant pressure.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

Figure 1:
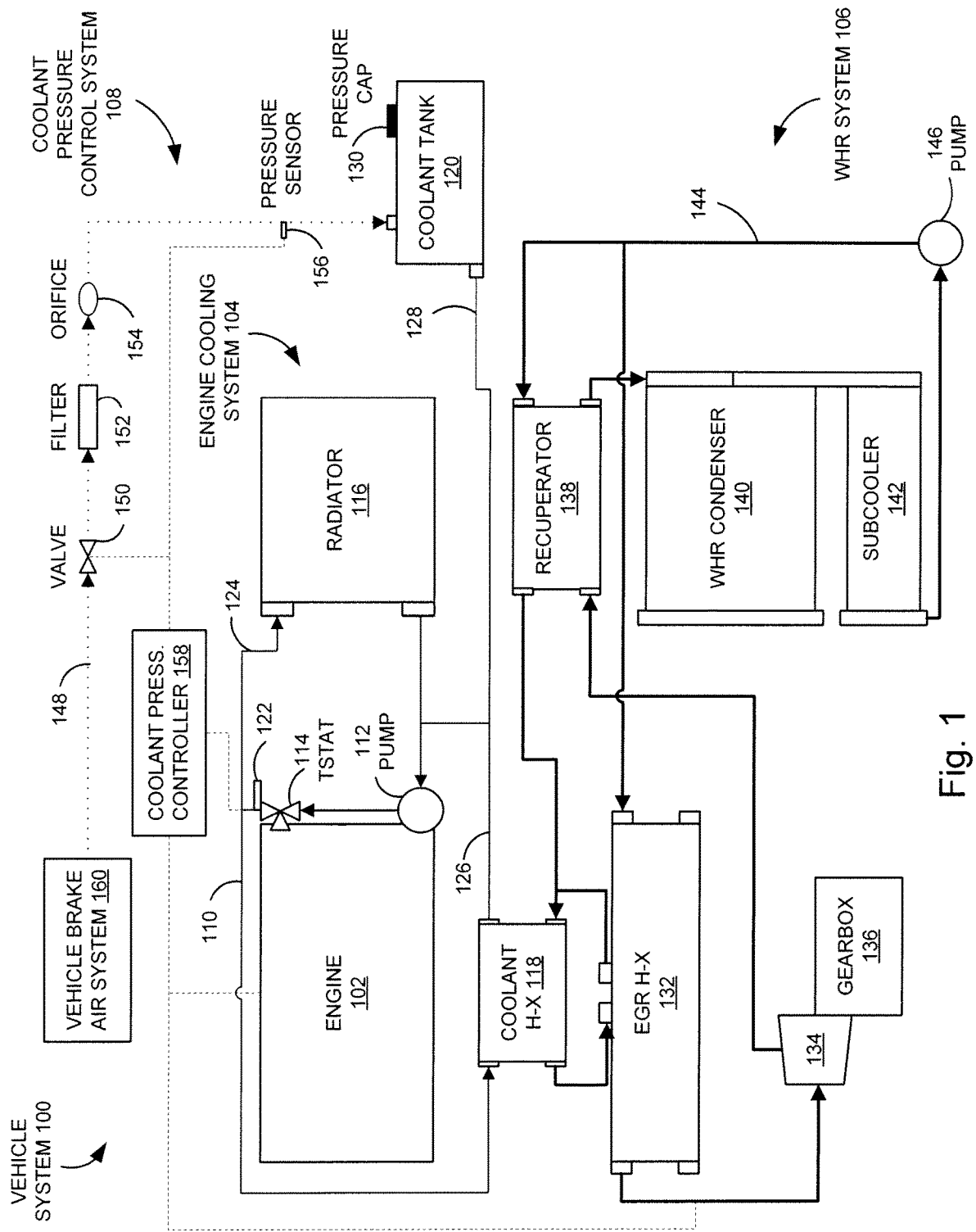
FIG. 1 is a schematic diagram illustrating a vehicle system, according to an example embodiment.

It will be recognized that the figures are representations for purposes of illustration. The figures are provided for the purpose of illustrating one or more implementations with the explicit understanding that they will not be used to limit the scope or the meaning of the claims.

DETAILED DESCRIPTION

Engine cooling systems operate to ensure that temperatures of engine and other vehicle components do not exceed rated operating temperature limits. Vehicle cooling requirements have become more and more demanding because of increasingly stringent fuel efficiency demands, emissions regulations, and packaging constraints, among other factors.

Referring generally to the figures, various embodiments relate to a WHR and cooling system including active coolant pressure control. One example system includes an engine coolant system, a WHR system, and a coolant pressure control system. A coolant heat exchanger is positioned along a working fluid circuit of the WHR system and along an engine cooling circuit of the engine cooling system. The coolant heat exchanger is structured to transfer heat from coolant fluid in the engine cooling circuit to a working fluid in the working fluid circuit. The WHR (e.g., ORC WHR) system is structured to recover waste heat from engine coolant and from other waste heat sources. The engine coolant system is structured to operate with an elevated coolant fluid temperate relative to conventional coolant fluids so as to increase cycle efficiency. The coolant pressure control system is structured to regulate pressure of the coolant fluid so as to prevent the coolant fluid from boiling. The coolant pressure control system includes a pressure line operatively coupling a pressure source and a coolant fluid tank of the engine coolant system. In some embodiments, the pressure source is an air brake system. A valve is operatively coupled to the pressure line upstream of the coolant tank. A coolant pressure controller is in operative communication with each of the valve and various sensors. The coolant pressure controller is structured to control the valve so as to maintain the coolant fluid at a target coolant pressure (or within a target coolant pressure range). In some embodiments, the target coolant pressure (or target coolant pressure range) is determined based on one or more of coolant fluid temperature, engine load, and WHR system operating conditions.

According to various embodiments, the WHR and coolant system with active coolant pressure control solves various technical problems associated with existing WHR and coolant systems. In order to optimize cycle efficiency system, the coolant fluid is maintained at a higher operating temperature than conventional engine coolant systems, which enables more heat to be transferred from the coolant fluid to the working fluid of the WHR system. One way to maintain the coolant fluid at a higher temperature is to allow the increase in fluid volume due to the increase in temperature to cause a corresponding increase in the fluid pressure in the system. The coolant tank may include a pressure cap to maintain fluid pressure below a threshold level. However, one problem with this approach is that engine systems in operation may have small pressure leaks in the plumbing or pressure cap that cause the pressure to bleed down over time. A small leak can bleed the coolant pressure down to nearly atmospheric pressure over the course of a drive cycle. Another problem with this approach in conjunction with a WHR system is that the WHR system frequently changes the coolant temperature, so it is difficult to maintain the coolant at a target pressure. The instant system actively controls coolant fluid pressure via a pressure source, such as an air brake system, that provides pressurized air to the coolant tank via a pressure line. A coolant pressure controller actively maintains the coolant fluid at a target pressure by controlling a valve in the pressure line. The target pressure is determined based on one or more of coolant fluid temperature, engine load, and WHR system operating conditions. Actively controlling coolant fluid pressure allows the coolant fluid to be maintained at a higher temperature over a longer period of time. Actively controlling coolant fluid pressure also prevents the coolant fluid from boiling, which can cause damage to the engine or other associated components.

FIG. 1 is a schematic diagram illustrating a vehicle system 100, according to an embodiment. The vehicle system 100 comprises an engine 102, an engine cooling system 104, a WHR system 106, and a coolant pressure control system 108.

The engine 102 may be powered by any of various types of fuels (e.g., diesel, natural gas, gasoline, etc.). In some embodiments, the engine 102 operates as a prime mover for a vehicle. In other embodiments, the engine 102 operates as a prime mover for an electric power generator. In other embodiments, the engine 102 is another type of four-cycle or two-cycle engine. It should be understood that the vehicle system 100 also comprises an intake passage (not shown) fluidly coupled to an intake manifold of the engine 102 and an exhaust passage (not shown) fluidly coupled to an exhaust manifold of the engine 102. The intake passage is structured to transmit charge air to the intake manifold of the engine 102. The exhaust passage is structured to receive exhaust gas from the engine 102 and expel the exhaust gas to the external environment. In some embodiments, the exhaust passage comprises an exhaust gas recirculation passage structured to divert at least a portion of the exhaust gas to the intake manifold of the engine 102. It should be understood that the exhaust passage may also be operatively coupled to one or more aftertreatment components.

The engine cooling system 104 is structured to provide cooling for the engine 102. It should be understood that the engine cooling system 104 may be part of a larger vehicle cooling system that also provides cooling for other vehicle components. The engine cooling system 104 comprises an engine cooling circuit 110 that defines a flow path for coolant fluid flow through the engine 102 and other components of the engine cooling system 104. It should be understood that the engine cooling circuit 110 comprises conduits (not shown) fluidly coupling the engine 102 and other components of the engine cooling system 104. According to various embodiments, the coolant fluid may include a glycol-based coolant, water, or other coolant fluids. In other embodiments, the coolant fluid is a thermal oil or other type of heat transfer fluid. The engine cooling system 104 also comprises a first pump 112, a thermostat 114, a radiator 116, a coolant heat exchanger 118, and a coolant tank 120.

The first pump 112 (e.g., a water pump) is positioned along the engine cooling circuit 110 upstream of the engine 102. It should be understood that the terms "upstream" and "downstream," when referring to the engine cooling system 104, are defined relative to the flow direction of the coolant fluid through the engine cooling system 104. The first pump 112 is structured to circulate the coolant fluid through the engine cooling circuit 110. The thermostat 114 is positioned along the engine cooling circuit 110 downstream of the engine 102. A temperature sensor 122 is positioned proximate an outlet of the thermostat 114 and is structured to provide a temperature value indicative of a temperature of the coolant fluid exiting the engine 102.

The radiator 116 is positioned along the engine cooling circuit 110 downstream of the engine 102 on a first leg 124 of the engine cooling circuit 110. The first leg 124 fluidly couples the first pump 112, the engine 102, the thermostat 114, and the radiator 116. In operation, the coolant fluid flows through the first leg 124 from the first pump 112, through the engine 102, and subsequently through the radiator 116. In some embodiments, a fan is positioned proximate the radiator 116 and is structured to force air across the radiator 116 to facilitate convective heat transfer. In particular, the radiator 116 is structured to transfer heat from the hot coolant fluid received from the engine 102 to the ambient air.

The coolant heat exchanger 118 is positioned along a second leg 126 of the engine cooling circuit 110. The second leg 126 fluidly couples the first pump 112, the engine 102, the thermostat 114, and the coolant heat exchanger 118. In some embodiments, the first and second legs 124, 126 are arranged in parallel with each other. In operation, the coolant fluid flows through the second leg 126 from the first pump 112 to the engine 102 and subsequently through the coolant heat exchanger 118. The coolant heat exchanger 118 is discussed further below in connection with the WHR system 106.

The coolant tank 120 is positioned along a third leg 128 of the engine cooling circuit 110. The third leg 128 fluidly couples the coolant tank 120 with each of the first and second legs 124, 126 of the engine cooling circuit 110 so as to provide the coolant fluid to the engine cooling circuit 110. A pressure cap 130 is removably coupled to the coolant tank 120 so as to provide access thereto (e.g., to fill the coolant tank 120 with coolant fluid). The pressure cap 130 is structured to release pressure from the coolant tank 120 above a threshold pressure so as to maintain the pressure in the coolant tank 120 below the threshold pressure. The pressure cap 130 is also structured to allow air into the coolant tank 120 when the engine cooling system 104 (e.g., a passage of the engine cooling circuit 110) drops below a threshold pressure (e.g., ambient air pressure). For example, the engine cooling system 104 may drop below ambient air pressure when the engine cooling circuit 110 cools down, such as when the engine 102 is shut off.

In some embodiments, one or more valves (not shown) are positioned along the engine cooling circuit 110. The one or more valves are structured to selectively block the coolant fluid from any of the first, second, and third legs 124, 126, 128 so as to divert some or all of the coolant fluid to others of the first, second, and third legs 124, 126, 128. For example, a valve positioned along the first or second legs 124, 126 may selectively control fluid flow through the second leg 126 to control the amount of cooling provided to the coolant fluid by the coolant heat exchanger 118. The one or more valves may control flow through one or more of the first, second, and third legs 124, 126, 128 based on the temperature of the coolant fluid, as determined by the temperature sensor 122.

The WHR system 106 is structured to convert waste heat produced by the engine 102 and other components of the vehicle system 100 into useful energy, such as mechanical and/or electrical energy. For example, the WHR system 106 is structured to convert waste heat from the engine cooling system 104 to useful energy. In some embodiments, the WHR system 106 is further configured to convert waste heat from other sources, such as charge air, exhaust gas recirculation ("EGR") gas, and/or other sources.

The WHR system 106 comprises the coolant heat exchanger 118, an EGR heat exchanger 132, an expander 134, a gearbox 136, a recuperator 138, a condenser 140, and a subcooler 142 positioned along a working fluid circuit 144. The working fluid circuit 144 comprises a second pump 146 (e.g., a feed pump) structured to circulate a working fluid through the various components of the WHR system 106.

The coolant heat exchanger 118 is structured to transfer heat energy from the coolant fluid in the engine cooling circuit 110 to the working fluid in the working fluid circuit 144 so as to cool the coolant fluid and heat the working fluid. In operation, the coolant fluid that passes through the coolant heat exchanger 118 has been heated by the engine 102. Therefore, the coolant heat exchanger 118 cools the coolant fluid, thereby providing cooling to the engine 102. According to various embodiments, the working fluid can include any of various types of fluids, such as, for example, a refrigerant (e.g., R245a or other low global warming potential ("GWP") replacements), ethanol, toluene, other hydrocarbon-based working fluids, other hydrofluorocarbon-based working fluids, or water. Because the coolant heat exchanger 118 removes heat from the coolant fluid, the coolant heat exchanger 118 performs at least a portion of the cooling operations of a conventional coolant radiator. Thus, in some embodiments, the radiator 116 of the engine cooling system 104 can be smaller in size (e.g., has less cooling capacity) than a conventional coolant radiator. In addition, the coolant heat exchanger 118 provides for improved efficiency by transferring heat energy from the coolant fluid to the working fluid. The WHR system 106 generates useful energy from the heat energy received from the coolant fluid of the engine cooling system 104. In contrast, this heat energy is discharged to the external environment in conventional systems.

The EGR heat exchanger 132 is positioned along the working fluid circuit 144 in parallel with the coolant heat exchanger 118 and upstream of the expander 134. It should be understood that the terms "upstream" and "downstream," when referring to the working fluid circuit 144, are defined relative to the flow direction of the working fluid through the working fluid circuit 144. The EGR heat exchanger 132 is operatively and fluidly coupled to an EGR passage of the engine so as to receive EGR gas from the exhaust manifold of the engine 102. The EGR heat exchanger 132 is structured to transfer heat from the EGR gas to the working fluid in the working fluid circuit 144 so as to cool the EGR gas and further heat the working fluid. The cooled EGR gas is then transferred to the intake manifold of the engine 102. The EGR heat exchanger 132 is also structured to transfer heat from the working fluid flowing through the coolant heat exchanger 118 to the working fluid flowing through the EGR heat exchanger 132. As the working fluid is heated by each of the coolant heat exchanger 118, the EGR heat exchanger 132, and the recuperator 138, the working fluid can be heated sufficiently so that the working fluid is in a substantially vapor form prior to reaching the expander 134.

The expander 134 is positioned along the working fluid circuit 144 downstream of the EGR heat exchanger 132 and upstream of the recuperator 138. As the substantially vaporized working fluid travels through the expander 134 the vapor expands and loses pressure, thereby driving a turbine of the expander 134 to generate useful work. According to various embodiments, the expander 134 may include a piston expander, a screw expander, a scroll expander, a gerotor expander, or other type of expander.

The gearbox 136 is operatively coupled to the expander 134 so as to transmit mechanical energy from the expander 134 to one or more other components. In some embodiments, an output of the gearbox 136 is operatively coupled to a generator, which can convert the mechanical energy from the rotating turbine of the expander 134 into electrical energy. In other embodiments, the output of the gearbox 136 is operatively coupled to a crankshaft of the engine 102, an engine accessory shaft, and/or other components, for example, via a gear or belt drive so as to transfer mechanical energy to those devices.

The recuperator 138 is positioned along the working fluid circuit 144 downstream of the expander 134 and upstream of the condenser 140, and downstream of the second pump 146 and upstream of the coolant heat exchanger 118. The recuperator 138 is structured to transfer heat from the warm working fluid received from the expander 134 to the cold working fluid received from the subcooler 142 via the second pump 146 so as to pre-heat the working fluid before the working fluid is transmitted to the coolant heat exchanger 118. Some embodiments do not include the recuperator 138.

The condenser 140 is positioned along the working fluid circuit 144 downstream of the recuperator 138. The condenser 140 is structured to receive the working fluid from the recuperator 138 and to transfer heat from the working fluid to the ambient environment, thereby substantially or fully condensing the working fluid back to a liquid.

The subcooler 142 is positioned along the working fluid circuit 144 downstream of the condenser 140. The subcooler 142 is structured to receive the working fluid from the condenser 140 and to transfer heat from the working fluid to the ambient environment, thereby further cooling the working fluid, which is substantially in liquid form at this stage. The working fluid is then transferred from the subcooler 142 to the second pump 146 and is cycled again through the working fluid circuit 144.

The coolant pressure control system 108 comprises a pressure line 148, a valve 150, a filter 152, an orifice 154, a pressure sensor 156, and a coolant pressure controller 158. The pressure line 148 fluidly couples a vehicle brake air system 160 and the coolant tank 120 so as to transmit pressurized air from the vehicle brake air system 160 to the coolant tank 120. The pressure line 148 comprises a conduit (e.g., a hose) structured to transmit a pressurized fluid. In some embodiments, a different type of pressure source is utilized rather than the vehicle brake air system 160. For example, some embodiments include an air compressor instead of the vehicle brake air system 160.

The valve 150 is operatively coupled to the pressure line 148 downstream of the vehicle brake air system 160. The valve 150 is structured to control fluid flow through the pressure line 148. In some embodiments, the valve 150 is a solenoid valve.

The filter 152 is operatively coupled to the pressure line 148 downstream of the valve 150. The filter 152 is structured to remove debris from the pressurized air flowing through the pressure line 148. The filter is utilized to prevent the orifice from getting clogged.

The orifice 154 is operatively coupled to the pressure line 148 downstream of the filter 152 and upstream of the coolant tank 120. The orifice 154 is structured to throttle the flow of pressurized air through the pressure line 148 so as to prevent pressure spikes and to limit the rate at which air pressure can be applied to the coolant tank 120.

The pressure sensor 156 is operatively coupled to the pressure line 148 upstream of the coolant tank 120. In some embodiments, the pressure sensor 156 is positioned downstream of the orifice 154. However, in other embodiments, the pressure sensor 156 is positioned in other locations. Some embodiments include multiple pressure sensors 156. The pressure sensor 156 is structured to provide an air pressure value indicative of a pressure of the pressurized air in the pressure line 148. It should be appreciated that the air pressure value is also indicative of a pressure in the coolant tank 120.

The coolant pressure controller 158 is communicatively and operatively coupled to each of the engine 102, the temperature sensor 122, the valve 150, and the pressure sensor 156. In some embodiments, the coolant pressure controller 158 is also communicatively and operatively coupled to other components, such as to one or more sensors of the WHR system 106. As described further below in connection with FIG. 2, the coolant pressure controller 158 is structured to determine a target pressure based on various factors (e.g., such as one or more of coolant temperature, engine load, engine speed, vehicle speed, and WHR system operating conditions) and to control operation of the valve 150 so as to maintain a pressure of the coolant fluid in the engine cooling circuit 110 at the target pressure. Vehicle speed refers to a speed of a vehicle powered by the engine 102.

The coolant pressure control circuit 208 is structured to determine changes in temperature of the coolant fluid over a time period with regard to one or more operating conditions. The coolant pressure controller 158 is also structured to determine a second coolant temperature based on the coolant temperature value and a first temperature change. The second coolant temperature relates to a temperature of the coolant fluid at the end of the time period, as a result of the coolant fluid being cooled or heated as a result of the analyzed factor. The coolant pressure controller 158 determines the target coolant pressure so as to be higher than a pressure at which the coolant fluid, at the second coolant temperature, boils.

For example, operating conditions of the WHR system 106 can affect coolant fluid temperature. Operating conditions of the WHR system 106 may include, for example, temperature of the working fluid at various positions within the working fluid circuit 144, pressure of the working fluid at various positions within the working fluid circuit 144, flow rate of the working fluid at various positions within the working fluid circuit 144, temperature of exhaust gas flowing through the EGR heat exchanger 132, pressure or power output of the second pump 146, and other conditions.

In another example, the temperature of the working fluid in the working fluid circuit 144 relative to the temperature of the coolant fluid in the engine cooling circuit 110 affects the coolant fluid temperature. More specifically, the greater the difference between the temperature of the working fluid and the temperature of the coolant fluid proximate the coolant heat exchanger 118, the more heat that is transferred from the coolant fluid to the working fluid. The change in coolant fluid temperature would in turn cause a corresponding change in coolant fluid pressure, and therefore, a corresponding change in a coolant fluid boiling point (a temperature at which the coolant fluid boils).

In one embodiment, the coolant pressure controller 158 is structured to determine, based on a working fluid temperature of the working fluid in the working fluid circuit 144 proximate the coolant heat exchanger 118, a first temperature change of the coolant fluid over a time period. The coolant pressure controller 158 is also structured to determine, based on the coolant temperature value and the first temperature change, a second coolant temperature. The second coolant temperature relates to a temperature of the coolant fluid at the end of the time period. The coolant pressure controller 158 determines the target coolant pressure so as to be higher than a pressure at which the coolant fluid, at the second coolant temperature, boils.

In another embodiment, an increase in engine load may also cause a latent increase in engine operating temperature, and therefore, in coolant fluid temperature. The increase in coolant fluid temperature would in turn cause a corresponding increase in coolant fluid pressure, and therefore, a corresponding increase in a coolant fluid boiling point (a temperature at which the coolant fluid boils). Conversely, a decrease in engine load would likely cause a latent decrease in engine operating temperature, and therefore, in coolant fluid temperature. The decrease in coolant fluid temperature would cause a corresponding decrease in coolant fluid pressure, and therefore, a corresponding decrease in a coolant fluid boiling point. In one embodiment, the coolant pressure controller 158 determines, based on engine load, a second temperature change of the coolant fluid over the time period. The coolant pressure controller 158 determines the second coolant temperature further based on the second temperature change.

In another example, vehicle speed affects coolant temperature. An increase in vehicle speed increases the convective cooling capabilities of the engine cooling system 104. In particular, an increase in vehicle speed causes a greater amount of ram air, at a higher velocity, to flow through the radiator 116, thereby increasing the amount of cooling that the radiator 116 provides to the coolant fluid. Therefore, an increase in engine speed may cause a corresponding decrease in coolant fluid temperature. Conversely, a decrease in vehicle speed may cause a corresponding increase in coolant fluid temperature. In one embodiment, the coolant pressure controller 158 determines, based on vehicle speed, a third temperature change of the coolant fluid over the time period. The coolant pressure controller 158 determines the second coolant temperature further based on the third temperature change.

In some embodiments, temperature changes due to the above-mentioned factors that are analyzed to determine the target coolant pressure (e.g., coolant temperature, engine load, vehicle speed, and WHR system operating conditions, etc.) are modeled based on empirical test data and/or computational (e.g., computational fluid dynamics, finite element, etc.) models. The parametric models may be stored in memory on the coolant pressure controller 158 (e.g., as look-up tables or transfer functions), and referenced by the coolant pressure controller 158 during operation to determine the target coolant pressure.

Figure 2:
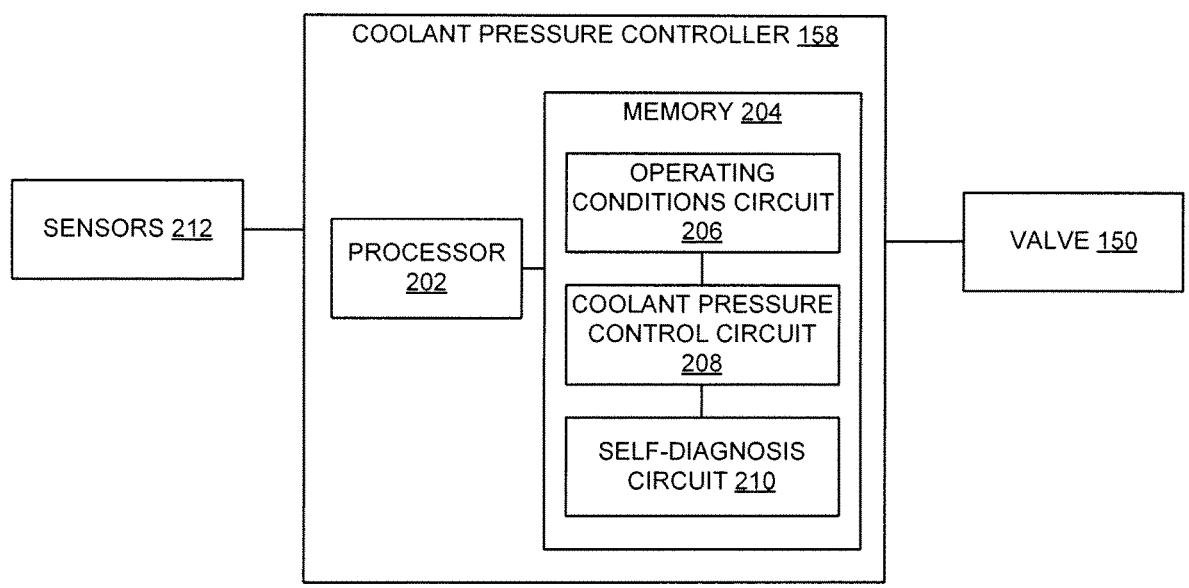
FIG. 2 is a block diagram of a coolant pressure controller of the vehicle system of FIG. 1.

FIG. 2 is a block diagram of the coolant pressure controller 158 of FIG. 1. The coolant pressure controller 158 includes a processor 202 and memory 204. The memory 204 is shown to include an operating conditions circuit 206 a coolant pressure control circuit 208, and a self-diagnosis circuit 210, each communicably coupled to the others. In general, the operating conditions circuit 206 and the coolant pressure control circuit 208 are structured to control operation of at least one of the engine cooling system 104, the WHR system 106, and the coolant pressure control system 108 based on monitored operating conditions of the vehicle system 100. While various circuits with particular functionality are shown in FIG. 2, it should be understood that the coolant pressure controller 158 may include any number of circuits for completing the functions described herein. For example, the activities of multiple circuits may be combined as a single circuit, additional circuits with additional functionality may be included, etc. Further, it should be understood that the coolant pressure controller 158 may further control other vehicle activity beyond the scope of the present disclosure. For example, in some embodiments, the coolant pressure controller 158 is implemented via an electronic engine control module, transmission control module, etc.

Certain operations of the coolant pressure controller 158 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, receiving a value by which the interpreted parameter can be calculated, and/or by referencing a default value that is interpreted to be the parameter value.

The operating conditions circuit 206 is in operative communication with various sensors 212. For example, the sensors 212 may include the temperature sensor 122 and pressure sensor 156 of FIG. 1. The operating conditions circuit 206 is structured to receive measurement values from the sensors 212 and to interpret measurement values based on the received measurement values. The sensors 212 may include any of various types of sensors configured to measure characteristics related to the engine 102, the engine cooling system 104, the WHR system 106, and the coolant pressure control system 108, and/or related systems. The sensors 212 may also include other temperature sensors (e.g., on the engine block, in any of the coolant or working fluid passages, in the exhaust passage, or in any other location), an engine speed sensor, an engine torque sensor, a vehicle speed sensor, a position sensor, etc. Accordingly, the measurement values may include, but are not limited to, an engine temperature, a coolant temperature, a working fluid temperature, an exhaust temperature, an engine speed, an engine load, a vehicle speed, a valve position, and/or any other engine or system characteristics.

The coolant pressure control circuit 208 is in operative communication with the operating conditions circuit 206, and the valve 150 of the coolant pressure control system 108 of FIG. 1. The coolant pressure control circuit 208 is structured to determine a target pressure based on various factors (e.g., one or more of coolant temperature, engine load, engine speed, vehicle speed, and WHR system operating conditions) and to control operation of the valve 150 so as to maintain a pressure of the coolant fluid in the engine cooling circuit 110 at or above the target pressure.

The coolant pressure control circuit 208 is structured to determine changes in temperature of the coolant fluid over a time period with regard to one or more operating conditions. For example, in one embodiment, the coolant pressure control circuit 208 determines a first temperature change of the coolant fluid over a time period, based on a working fluid temperature of the working fluid in the working fluid circuit 144 proximate the coolant heat exchanger 118. The coolant pressure control circuit 208 is also structured to determine a second coolant temperature based on the coolant temperature value and the first temperature change. The second coolant temperature relates to a temperature of the coolant fluid at the end of the time period, as a result of the coolant fluid being cooled by the working fluid. The coolant pressure control circuit 208 determines the target coolant pressure so as to be higher than a pressure at which the coolant fluid, at the second coolant temperature, boils. The coolant pressure control circuit 208 is structured to control operation of the valve 150 so as to cause the pressure of the coolant tank 120 to approach the target coolant pressure.

The coolant pressure control circuit 208 is structured to determine respective temperature changes due to any of the factors mentioned above. The coolant pressure control circuit 208 determines the second coolant temperature based on the aggregate contributions of the temperature changes caused by each factor.

The self-diagnosis circuit 210 is structured to perform a self-diagnosis analysis of operation of the coolant pressure control system 108 to verify that the coolant pressure control system 108 as a whole, as well as specific components of the coolant pressure control system 108, are operating properly. In some embodiments, the self-diagnosis circuit 210 performs the self-diagnosis analysis at initial start-up of the engine 102, while the engine 102 is still cold. In some embodiments, the self-diagnosis circuit 210 performs the self-diagnosis analysis in response to another trigger, such as vehicle speed, coolant temperature, engine speed, engine load, brake air pressure, or other parameters. In some embodiments, the self-diagnosis circuit 210 performs the self-diagnosis analysis in response to a manual input.

In response to the self-diagnosis analysis passing with no issues, the self-diagnosis circuit 210 enables normal operation of the coolant pressure control system 108. In response to the self-diagnosis analysis indicating one or more issues, the self-diagnosis circuit 210 can provide a warning to an operator and/or disable operation of the coolant pressure control system 108 or of the engine 102. In some embodiments, a warning is provided by transmitting a diagnostic trouble code. In some embodiments, a warning is provided by transmitting a control signal to cause illumination of a warning lamp.

In one embodiment, the self-diagnosis analysis performed by the self-diagnosis circuit 210 operates as follows. The valve position of the valve 150 is controlled to an open position. The pressure in the coolant tank is monitored over time. The self-diagnosis circuit 210 identifies an issue with the coolant pressure control system 108 in response to the pressure in the coolant tank 120 failing to exceed a threshold pressure value. Failing this portion of the self-diagnosis analysis can indicate improper operation of one or more of the valve 150, the pressure sensor 156, the vehicle brake air system 160, or of a leak in the engine cooling circuit 110 or the coolant tank 120.

In one embodiment, the self-diagnosis analysis performed by the self-diagnosis circuit 210 operates as follows. The valve position of the valve 150 is controlled to an open position. The pressure in the coolant tank 120 is monitored. In response to the pressure in the coolant tank 120 exceeding a first threshold pressure value, the valve position of the valve 150 is controlled to a closed position. The pressure in the coolant tank is monitored over time. The self-diagnosis circuit 210 identifies an issue with the coolant pressure control system 108 in response to the pressure in the coolant tank 120 falling below a second threshold pressure value within a predetermined time period. Failing this portion of the self-diagnosis analysis can indicate a leak in the engine cooling circuit 110 or the coolant tank 120. In some embodiments, the self-diagnosis circuit 210 performs both self-diagnosis analyses described above.

Figure 3:
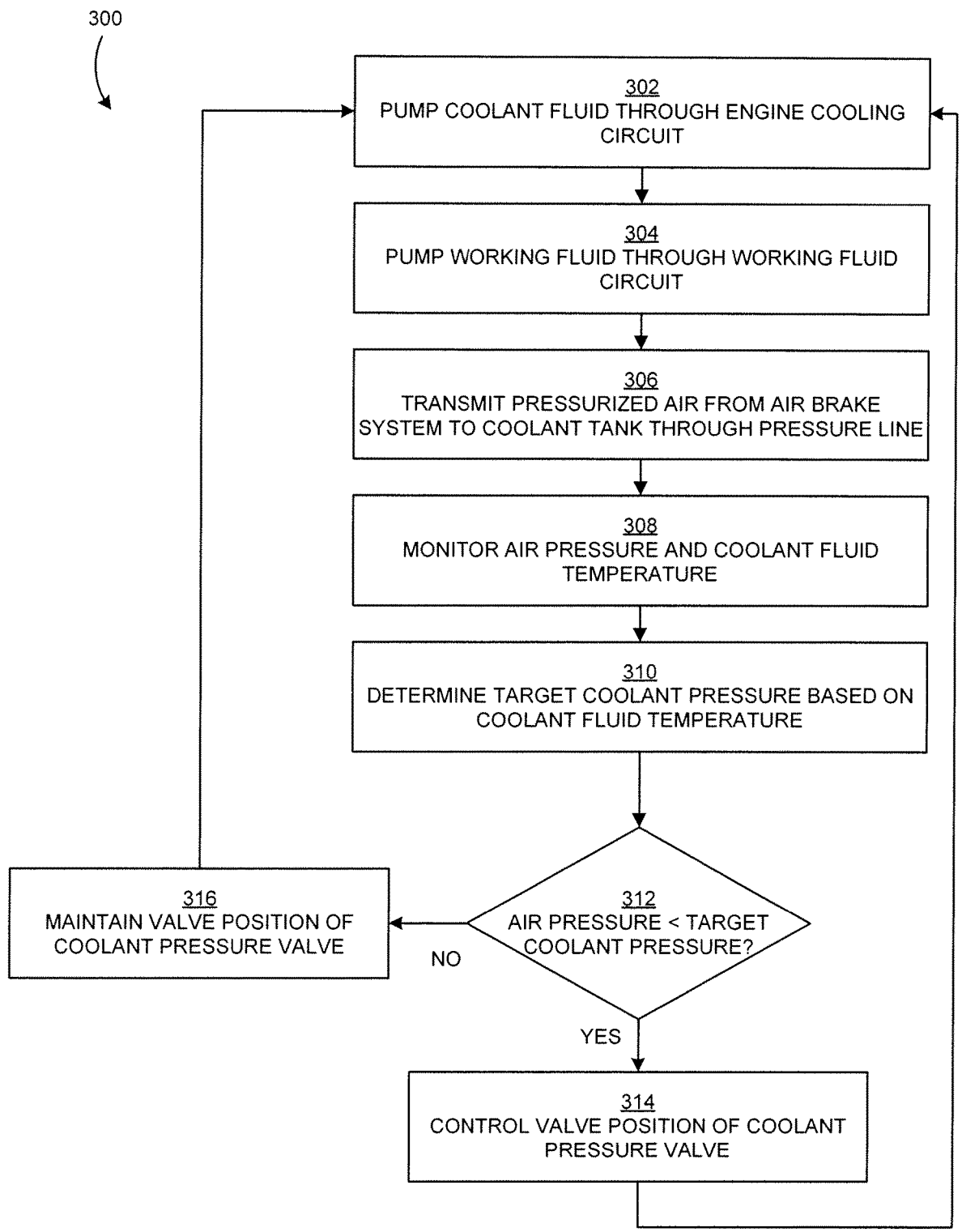
FIG. 3 is a flow diagram of a method of controlling a coolant pressure control system for an engine and a WHR system, according to an example embodiment.

FIG. 3 is a flow diagram of a method 300 of controlling a coolant pressure control system for an engine and a WHR system, according to an embodiment. For example, the method 300 may be performed by the coolant pressure controller 158 of FIGS. 1 and 2 to control the coolant pressure control system 108 of FIG. 1.

At 302, coolant fluid is pumped through the engine cooling circuit 110. At 304, working fluid is pumped through the working fluid circuit 144. At 306, pressurized air is transmitted from the vehicle brake air system 160 to the coolant tank 120.

At 308, air pressure and coolant fluid temperature are monitored. In some embodiments, monitoring air pressure includes receiving an air pressure value of the pressurized air flowing through the pressure line 148 from the pressure sensor 156 operatively coupled to the pressure line 148 and interpreting the air pressure value. In some embodiments, monitoring coolant fluid temperature includes receiving a temperature value of the coolant fluid flowing through the engine cooling circuit 110 from the temperature sensor 122 positioned in the engine cooling circuit 110 and interpreting the temperature value. In some embodiments, other operational parameters are also monitored. For example, the operation parameters may include engine temperature, working fluid temperature, engine load, engine speed, vehicle speed, etc., or any combination thereof.

At 310, a target coolant pressure (or a target coolant pressure range) is determined based on the coolant fluid temperature monitored at 308. In some embodiments, the target coolant pressure is determined based on at least one of engine load and WHR system operating conditions, such as working fluid temperature. The target coolant pressure is determined so as to prevent the coolant fluid from boiling.

At 312, the coolant pressure controller 158 analyzes whether the monitored air pressure is less than the target coolant pressure (or a target coolant pressure range).

At 314, if the monitored air pressure is less than the target coolant pressure (or target coolant pressure range) (i.e., the answer to 312 is "YES"), the valve position of the valve 150 is controlled (e.g., opened) so as to cause the air pressure value to approach (or reach) the target coolant pressure (or target coolant pressure range). In other words, the valve 150 is controlled so as to allow more pressurized air through the valve 150.

At 316, if the monitored air pressure is not less than the target coolant pressure (or target coolant pressure range) (i.e., the answer to 312 is "NO"), the valve position of the valve 150 is maintained at its current position. In some embodiments, the rate of change of the monitored air pressure is analyzed, and the valve position is further controlled based on the rate of change.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

In certain implementations, the systems or processes described herein can include a controller structured to perform certain operations described herein. In certain implementations, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain implementations, the controller includes one or more circuits structured to functionally execute the operations of the controller. The description herein including circuits emphasizes the structural independence of the aspects of the controller and illustrates one grouping of operations and responsibilities of the controller. Other groupings that execute similar overall operations are understood within the scope of the present application. Circuits may be implemented in hardware and/or as computer instructions on a non-transient computer readable storage medium, and circuits may be distributed across various hardware or computer based components. More specific descriptions of certain embodiments of controller operations are included in the section referencing FIGS. 1-3.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuits specification, any actuator including at least an electrical, hydraulic, or pneumatic actuator, a solenoid, an op-amp, analog control elements (springs, filters, integrators, adders, dividers, gain elements), and/or digital control elements.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It should be understood by those of skill in the art who review this disclosure that various features are described and claimed without restricting the scope of these features to the precise numerical ranges provided unless otherwise noted. Accordingly, insubstantial or inconsequential modifications or alterations of the subject matter described and claimed are considered to be within the scope of the invention as recited in the appended claims.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A system, comprising:
    an engine cooling system, comprising:
        a coolant tank,
        an engine cooling circuit in coolant fluid receiving communication with the coolant tank, the engine cooling circuit comprising a first pump structured to circulate the coolant fluid through the engine cooling circuit,
        a coolant heat exchanger positioned along the engine cooling circuit, and
        a first temperature sensor positioned along the engine cooling circuit, the first temperature sensor structured to provide a coolant temperature value of the coolant fluid flowing through the engine cooling circuit;
    a waste heat recovery system, comprising:
        a working fluid circuit comprising a second pump structured to circulate a working fluid through the working fluid circuit, and
        the coolant heat exchanger positioned along the working fluid circuit and structured to transfer heat from the coolant fluid to the working fluid; and
    a coolant pressure control system operatively coupled to the engine cooling system, the coolant pressure control system comprising:
        a pressure line operatively coupled to a pressure source and to the coolant tank,
        a valve operatively coupled to the pressure line upstream of the coolant tank,
        a pressure sensor operatively coupled to the pressure line downstream of the valve and upstream of the coolant tank, the pressure sensor structured to provide a pressure value indicative of a pressure in the coolant tank, and
        a coolant pressure controller in operative communication with each of the valve, the pressure sensor, and the first temperature sensor, the coolant pressure controller structured to:
            interpret the pressure value,
            interpret the coolant temperature value,
            determine a target coolant pressure based on the coolant temperature value, and
            control a valve position of the valve so as to cause the pressure value to approach the target coolant pressure.

2. The system of claim 1, wherein the coolant pressure controller is further structured to determine the target coolant pressure so as to prevent the coolant fluid from boiling.

3. The system of claim 1, wherein the coolant pressure controller is further structured to determine the target coolant pressure based on at least one of engine load, engine speed, working fluid temperature, and vehicle speed.

4. The system of claim 1, wherein the coolant pressure controller is further structured to:
    determine, based on a working fluid temperature of the working fluid in the working fluid circuit proximate the coolant heat exchanger, a first temperature change of the coolant fluid over a time period; and determine, based on the coolant temperature value and the first temperature change, a second coolant temperature, the second coolant temperature relating to a temperature of the coolant fluid upon completion of the time period, wherein the target coolant pressure is determined to be higher than a pressure at which the coolant fluid, at the second coolant temperature, boils.

5. The system of claim 4, wherein the coolant pressure controller is further structured to:

determine, based on engine load, a second temperature change of the coolant fluid over the time period, wherein the second coolant temperature is determined further based on the second temperature change.

6. The system of claim 4, wherein the coolant pressure controller is further structured to:

determine, based on vehicle speed, a third temperature change of the coolant fluid over the time period, wherein the second coolant temperature is determined further based on the third temperature change.

7. The system of claim 4, wherein the coolant pressure controller is further structured to, in response to the second coolant temperature exceeding a boiling point of the coolant fluid, controlling the valve position of the valve to an open position so as to cause an increase in pressure in the coolant tank.

8. The system of claim 1, wherein the waste heat recovery system further comprises:

an expander positioned along the working fluid circuit downstream of the coolant heat exchanger, the expander structured to convert energy from the heat transferred to the working fluid from the coolant fluid to mechanical energy; and a condenser positioned along the working fluid circuit downstream of the expander, the condenser structured to cool the working fluid.

9. The system of claim 1, wherein the coolant pressure control system further comprises:

a filter operatively coupled to the pressure line downstream of the valve, the filter structured to remove debris from pressurized air in the pressure line; and an orifice operatively coupled to the pressure line downstream of the filter and upstream of the coolant tank, the orifice structured to throttle flow of the pressurized air through the pressure line.

10. The system of claim 1, wherein the pressure source is an air brake system.

11. The system of claim 1, wherein the pressure source is a compressor.

12. The system of claim 1, wherein the coolant pressure controller is further structured to perform a self-diagnosis at engine start-up, the self-diagnosis comprising:

controlling the valve position of the valve to an open position;

monitoring the pressure in the coolant tank; and providing a warning in response to the pressure in the coolant tank failing to exceed a threshold pressure value.

13. The system of claim 1, wherein the coolant pressure controller is further structured to perform a self-diagnosis at engine start-up, the self-diagnosis comprising:

controlling the valve position of the valve to an open position;

monitoring the pressure in the coolant tank;

in response to the pressure in the coolant tank exceeding a first threshold pressure value, controlling the valve position of the valve to a closed position;

monitoring the pressure in the coolant tank; and providing a warning in response to the pressure in the coolant tank falling below a second threshold pressure value within a predetermined time period.

14. A system, comprising:

a pressure line operatively coupled to a pressure source and to a coolant tank, the coolant tank in coolant fluid providing communication with an engine cooling system;

a valve operatively coupled to the pressure line upstream of the coolant tank; and a coolant pressure controller in operative communication with the valve, the coolant pressure controller structured to:

determine a pressure in the coolant tank, determine a temperature of the coolant fluid in the engine cooling system, determine a target coolant pressure based on the temperature of the coolant fluid in the engine cooling system, and control a valve position of the valve so as to cause the pressure in the coolant tank to approach the target coolant pressure.

15. The system of claim 14, wherein the coolant fluid in the engine cooling system is cooled at least in part by a waste heat recovery system.

* * * * *